United States Patent
Henning

(10) Patent No.: US 6,234,562 B1
(45) Date of Patent: May 22, 2001

(54) HOLD-DOWN LOCKING MECHANISM FOR A FLEXIBLE COVER SYSTEM

(75) Inventor: Steven A. Henning, Speedway, IN (US)

(73) Assignee: Aero Industries, Inc., Indianapolis, IN (US)

(*) Notice: Subject to any disclaimer, the term of this patent is extended or adjusted under 35 U.S.C. 154(b) by 0 days.

(21) Appl. No.: 09/532,987

(22) Filed: Mar. 22, 2000

(51) Int. Cl.$^7$ .................................................. B60J 11/00
(52) U.S. Cl. .................. 296/100.16; 296/98; 296/100.14
(58) Field of Search ................................ 296/98, 100.14, 296/100.16

(56) References Cited

U.S. PATENT DOCUMENTS

| | | | |
|---|---|---|---|
| 3,330,225 | * | 7/1967 | Barry .......................... 296/100.16 X |
| 4,657,062 | * | 4/1987 | Tuerk .......................... 296/100.16 X |
| 5,957,523 | | 9/1999 | Haddad, Jr. . |
| 5,984,379 | * | 11/1999 | Michel et al. ................ 2986/100.16 |

FOREIGN PATENT DOCUMENTS

1684105 * 10/1991 (SU) ................................ 296/100.16

OTHER PUBLICATIONS

Aero Industries, Inc., "Roll Tarps for Dump Trailers."
Aero Industries, Inc., "Crank–N–Go Tarping System."
Aero Industries, Inc., "Easy Cover Tarping System Easy Cover."

* cited by examiner

Primary Examiner—Joseph D. Pape
(74) Attorney, Agent, or Firm—Baker & Daniels

(57) ABSTRACT

A wind-actuated hold-down mechanism is provided for restricting movement of a deployment component of a flexible cover deployment system associated with an open-topped container. In certain embodiments, the mechanism includes a vane member pivotably mounted to either the container or the deployment component. The vane member can include one locking element that engages another locking element mounted on the other of the container or the deployment component. The hold-down locking mechanism in certain embodiments is configured to restrict movement of a bail member for a cover deployment system. Other embodiments are configured to engage the end of a transverse bow. A hold-down mechanism can be biased to a neutral position clear of engagement between the container and the deployment component, using either a mechanical biasing component or a gravity biasing feature.

37 Claims, 10 Drawing Sheets

HOLD-DOWN LOCKING MECHANISM FOR A FLEXIBLE COVER SYSTEM

BACKGROUND OF THE INVENTION

The present invention relates to flexible covers or tarping systems for open-topped containers. The invention most particularly concerns an apparatus adapted for use with an open-topped container bed on a land vehicle, such as a dump truck. More specifically, the invention pertains to a mechanism for restraining the flexible cover or tarp when the vehicle is moving.

Many hauling vehicles, such as dump trucks, include open-topped containers used for hauling or storing various materials. In a typical dump truck application, the dump body is used to haul a variety of particulate material, such as gravel and the like, as well as organic materials, such as grain or produce.

Depending upon the nature of the materials stored in the open-topped container, it is often desirable to provide a cover for the container. A cover is particularly valuable when the containers are part of a vehicle, such as a dump truck. Rigid covers are well known that may be hinged from one end of the container body and pivoted from an open to a closed position. While rigid covers may be acceptable for stationary containers, the same is usually not true for land vehicles. In this industry, the rigid covers have given way to flexible cover systems. Systems of this type utilize a flexible tarpaulin that can be drawn from a stowed position at one end of the container, to a deployed position covering the open top of the vehicle container or bed. The flexible cover or tarpaulin is preferable in this arena because it can be easily stowed when the cover is not necessary, such as when a dump truck is being loaded. In addition, the flexible cover is generally easier to deploy than a rigid cover.

A variety of flexible cover or tarping systems have been developed that are geared toward particular hauling vehicle applications. One such tarping system is the Easy Pull® System of Aero Industries, Inc. The Easy Paul® System includes a flexible tarp that is wound around a spool at one end of the container body. A rope attached to the free end of the tarp can be used to unwind the tarp from the roller and draw the tarp along the length of the vehicle container bed.

Another cover system particularly suited for open-topped containers on hauling vehicles, is the Easy Cover® Tarping System also of Aero Industries, Inc. The Easy Cover® Tarping System includes a U-shaped bail that is pivotably mounted to the base of the vehicle container body. The horizontal section of the U-shaped bail is attached to the tarp, while the free ends of the vertical elements are pivotably mounted. In one application, the Easy Cover® System allows the tarp to be manually pulled in a sweeping arc over the container load.

Another particular application of a similar tarping system is generally depicted in FIG. 1. A vehicle 10, such as a dump truck, can include an open-topped container body 11. The body preferably includes a top rail 11b around its upper perimeter, and a number of vertically oriented support ribs 11a.

A tarpaulin cover 13 is depicted in FIG. 1 in its deployed configuration spanning the length of the container body 11. The tarp can be preferably stowed by winding onto a tarp roller 14 at the forward end of the vehicle. Both the tarp 13 and the roller 16 can be of a variety of known constructions, such as the Easy Cover® Tarping System.

In the particular illustrated vehicle application, a bail member 16 is mounted to the truck body 11 at a pivot mount 17. The bail member 16 is attached to the free end of the tarp 13 and arranged so that the pivoting travel of the bail member 16 moves the tarp from its stowed to its deployed position. The bail member 22 is preferably U-shaped, and includes a pair of elongated arms 18 connected to the vehicle at the pivot mount 17.

It is understood that the vehicle 10 shown in FIG. 1 represents one type of hauling vehicle that utilizes a flexible cover or tarping system. In other systems, the tarp is attached to and supported by curved bows that span the width of the truck bed. Like the system depicted in FIG. 1, the bow-type tarping system can be manually or mechanically deployed, typically by pulling the end of the tarp and sliding the bows along runners mounted to the top rail 11b the container body 11.

Regardless of the particular hauling vehicle application or tarp configuration, one problem that is persistently faced is the effect of air flow or wind as the vehicle is traveling. This problem becomes especially acute at high speeds. The tarpaulin 13 is affected in a number of ways by the air flow across a traveling vehicle 10. The front end of the vehicle creates turbulent air flow that travels along the length of the container body 11. This turbulence, which can be manifested by air vortices along the top rail 11b of the container body, has a tendency to lift the flexible cover 13 away from the top of the body 11. A similar result occurs due to the Bernoulli effect of the air passing over the top of the vehicle. In essence, the tarp 13 acts as an air foil, so that the air passing over the top of the tarp creates a lower pressure zone, which again results in displacing the tarp from the top of the container body 11.

All of these wind-related effects cause the tarp system and flexible cover to bellow and flap. In addition, rough road conditions can cause the tarp system, including its mechanical elements, to bounce. While this action of the tarp and the associated tarping system can be very noisy, the most deleterious effect is on the flexible cover 13 itself. The constant bellowing and flapping gradually wears the tarp down, which decreases its longevity. In addition, when the tarp 13 bellows, the load within the container body 11 is exposed to the elements.

In order to address this problem, various manually activated systems have been devised. In one common system, a web of cords are deployed over the cover 13 along the length of the container body 11. The ends of the cords can be attached to mounts fixed to the side of the body. In other systems, the bail member, such as bail member 16, can be activated to wrap the end of the cover over the end of the vehicle body. These systems can be either manually or mechanically operated, and can be tied down using a tie down rope at the end of the body.

Still other systems rely upon a complicated array of mechanical, electrical or hydraulic structures to apply a constant tension along the length of the tarp. However, in most cases, the tension along the length of the tarp does not alleviate the problem of bellowing and flapping of the side edges of the tarp along the top rail 11b of the vehicle body 11. In some cases, a tensioning cable is threaded through eyelets along the side edges of the flexible cover. These tension cables require some form of manual or mechanical intervention to tightening the cables once the cover has been deployed over the container body.

In spite of the many approaches to address the wind-related damage to the cover tarp, these wind effects remain substantially unchecked. All of the mechanical and rope-based systems have some amount of play or give that is exploited by the previously described wind effects, particularly at high vehicle speeds. Consequently, what is needed is a hold-down mechanism positively restrains the elements of the tarping system to counteract the detrimental impact of the wind rushing across and through the flexible tarp.

SUMMARY OF THE INVENTION

These problems are addressed by the present invention that contemplates a hold-down locking mechanism that operates on components of the cover deployment system. In certain embodiments, the locking mechanism operates on the arms of the bail member that is pivotably mounted to the container body. In other embodiments, the locking mechanism operates on bow members integrated into the flexible cover.

In one aspect of certain embodiments of the invention, the hold-down locking mechanism includes a vane member that is pivotably mounted to the side of the container body. The vane member includes a locking element that engages another locking element attached to an arm of the bail member when the bail member is in its deployed position. The vane member is initially in a neutral position adjacent the container body and apart from the bail member arm. In its deployed position, the vane member locking element prevents unwanted movement of the bail member arm.

In some embodiments of the invention, one important feature is that the vane member is actuated by the force of air flowing past the container body. This air flow can be due to wind blowing against a stationary container or due to apparent wind created by a container affiliated with a vehicle traveling above a certain road speed. Thus, in these embodiments, air pressure is exerted against the vane member to cause it to pivot from its neutral position to its deployed or activated position.

In one specific embodiment, the vane member includes a plate-like vane mounted to the container body by a hinge. The leading edge of the vane can be angled to create a modest air foil, thereby ensuring that air flow past the container body and vane will generate an outwardly directed force on the vane, rather than a force tending to push the vane into the container body. The vane member can also include a locking bar that pivots with the vane. The locking bar can engage a locking stop attached to an arm of the bail member. In certain embodiments, the locking stop can define a back stop and a rearwardly extending ramp that operates to increase the downward force applied by the vane locking bar to the bail member.

In a further aspect of certain embodiments, the vane member includes a biasing means for biasing the vane to its neutral position. In a specific embodiment, the biasing means can constitute a spring disposed between the vane member and the container body. The spring can be a torsion spring, extension spring, or the like.

In another embodiment of the invention, the vane member is attached to the arm of the bail member itself. In this embodiment, the vane member acts against a locking or stop element attached to the container body. In one specific embodiment, the vane member includes a U-shaped pivot element that is pivotably attached to and straddling the bail member arm. A vane is attached at one end of the pivot element, while the opposite end of the element includes a locking leg configuration. In this specific embodiment, the locking leg configuration is adapted to engage a bar projecting outwardly from the container body. With this embodiment, air flow or wind can be used to move the vane member from its neutral position to a position in which the locking leg configuration engages the locking bar to prevent movement of the bail member arm.

In an alternative embodiment, the vane member can be pivotably mounted to one side of the bail member arm. The vane member in this embodiment can include a locking tab projecting substantially perpendicularly from the back (downwind) face of the vane. This locking tab is situated beneath a locking stop attached to the container body when the vane member is pivoted to its deployed position.

In another aspect of the invention, the hold-down locking mechanism is adapted for use with a bow-type flexible cover system. In embodiments of this aspect, a vane member can be pivotably mounted to the container body adjacent an end of the tarp bow. The locking mechanism in this embodiment also includes a hook that pivots with the vane member. The hook is configured to catch and retain the end of the tarp bow when the hook is in its actuated position.

In an alternative embodiment, the vane member and hook are separate components operably coupled through a gear train. The vane member is connected to one gear that rotates as the vane member pivots. The hook can be connected to a mating gear that rotates in response to rotation of the vane member gear. The gear ratio can be modified between the two gears to multiply the hold-down force generated by pivoting of the vane member.

In certain embodiments of the invention, mechanical biasing means are provided to bias the locking mechanism to its neutral position. This biasing means can be overcome by a predetermined air flow or air pressure being exerted on the vane member. When, for example, the wind flow reaches a certain apparent speed, the force exerted against the vane is sufficient to overcome the restoring force of the biasing means, thereby allowing the vane member to pivot to its deployed position. As the apparent wind speed decreases below the threshold value, the biasing means draws the vane member back to its neutral position.

In another feature, the biasing means can be replaced by a gravity biasing arrangement. In this arrangement, the pivoting components are sized and configured so that the vertically downward force of gravity continuously acts on the pivoting elements to guide them to a neutral position. In certain embodiments, the mass of the vane member is adjusted to take advantage of this gravity biasing aspect. In other embodiments, a separate mass can be utilized to provide a gravity based restoring force to the pivoting components of the locking mechanism.

It is one object of the present invention to provide an active mechanism operable to hold a flexible cover on the open top of a container body. A more specific object is to provide this feature for hauling vehicles to overcome the nefarious effects of wind and vibration as the vehicle is traveling.

One benefit of the invention is that it provides a simple mechanism that can operate to restrain deployment components of a flexible cover system. Another benefit is produced by certain embodiments that operate automatically, such as at a predetermined apparent wind speed.

These and other objects and benefits of the various embodiments of the present invention can be appreciated upon consideration of the following written description and accompanying figures.

DESCRIPTION OF THE PREFERRED EMBODIMENTS

Figure 1:
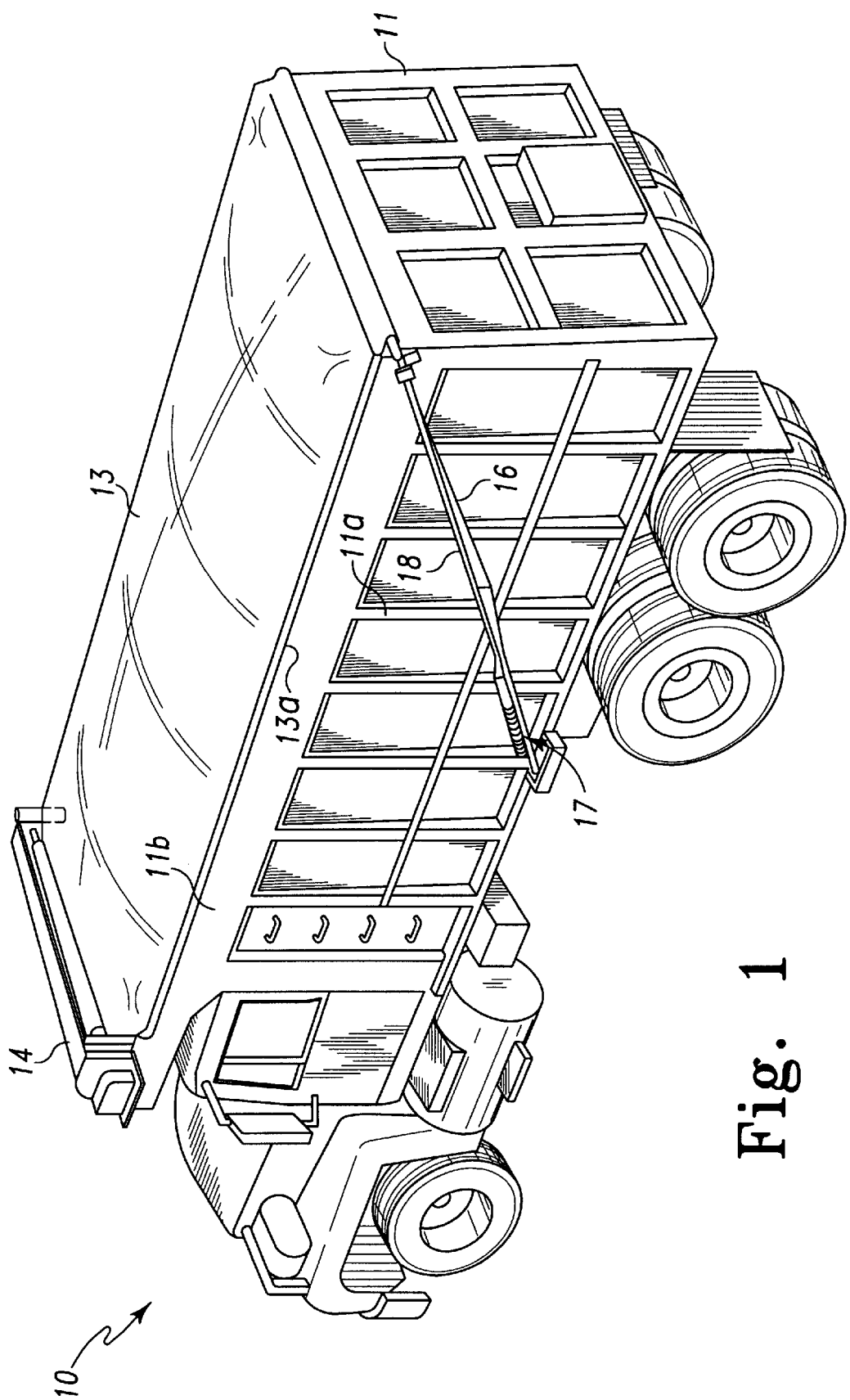
FIG. 1 is a top perspective view of a hauling vehicle utilizing a flexible tarping system.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention contemplates a hold-down locking mechanism operable to provide a restraining force against a flexible cover to counteract effects of wind passing by the cover. While the illustrated embodiments are particular adapted for use for hauling vehicles, the same principals can be applied to stationary open-topped containers utilizing flexible covers. In addition, the illustrated embodiments more specifically pertain to a dump truck hauling vehicle such as the truck 10 shown in FIG. 1. Nevertheless, the same principals can be applied to a variety of hauling vehicles having open-topped containers.

In one feature of the invention, a number of embodiments of a hold-down locking mechanism are automatically actuated by air flow across a vane member. The air flow causes the vane member to move from a neutral position to a deployed or activated position. In the deployed position, the vane member operates to positively restrain or stop the movement of an element of the tarping system. In the preferred embodiments, the vane member operates to restrain movement of the bail member of a tarping deployment system.

Figure 2A:
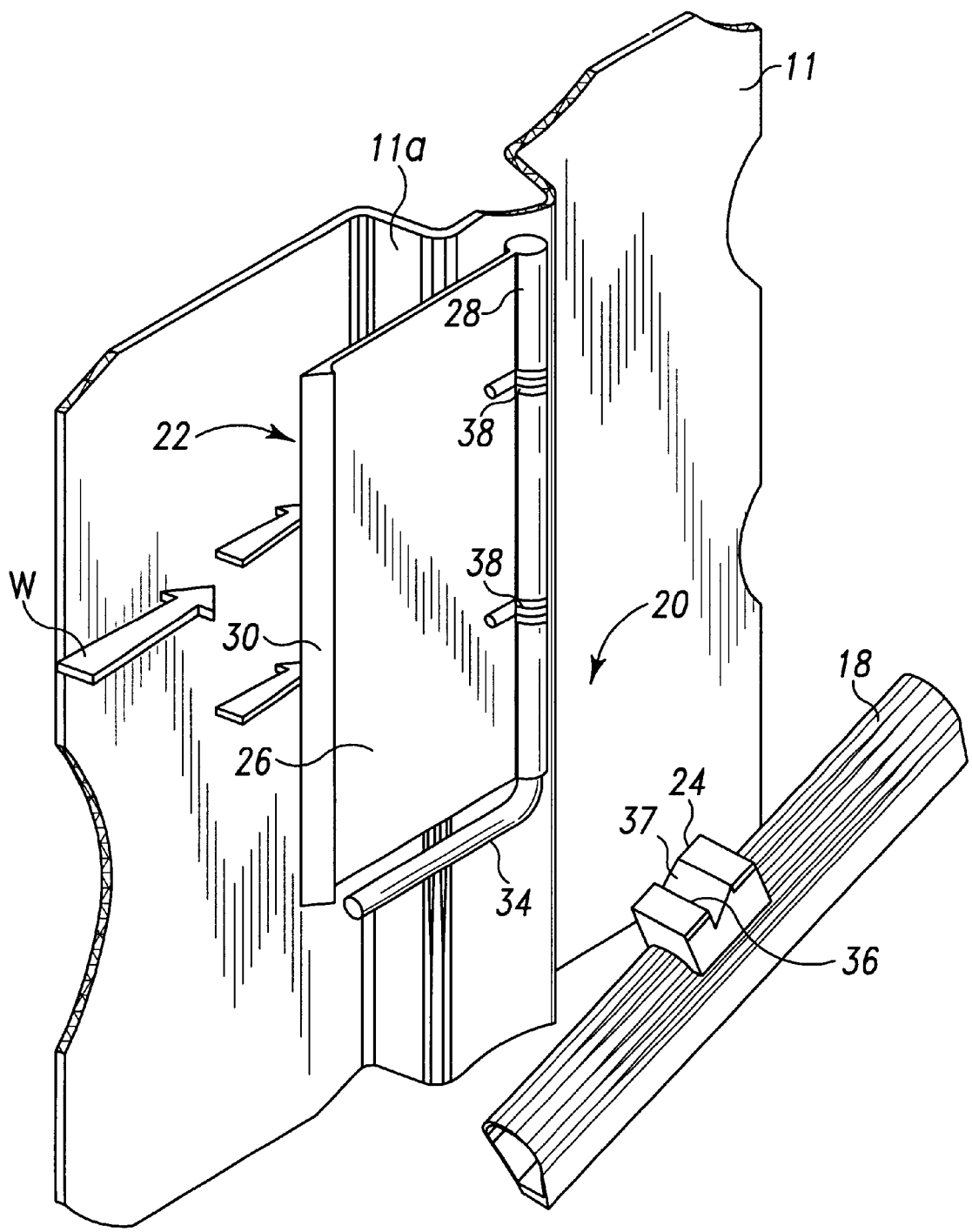
FIG. 2a is a side perspective view of a hold-down locking mechanism according to one embodiment of the invention, with the mechanism in its neutral position.
Figure 2B:
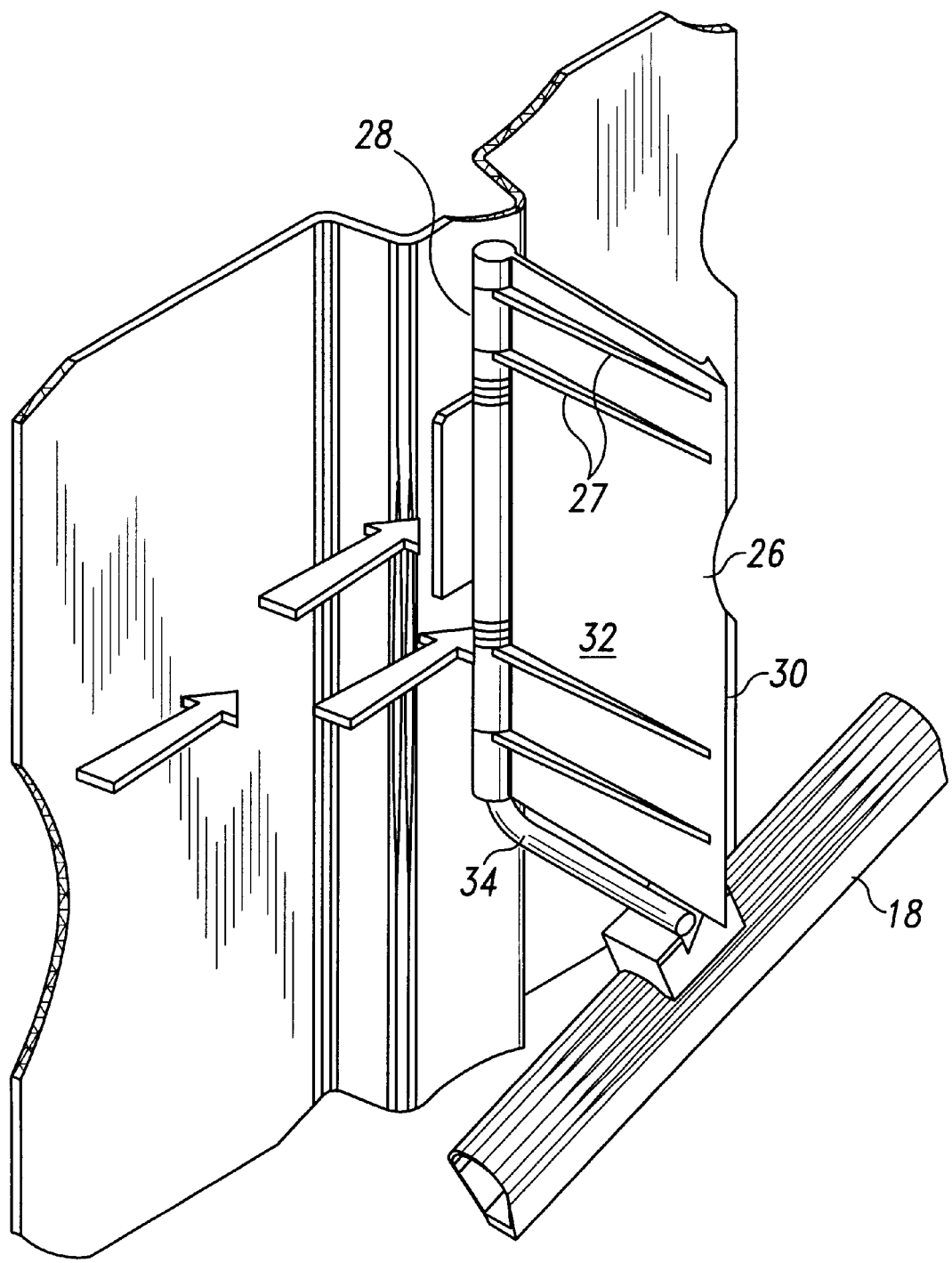
FIG. 2b is a side elevational view of the hold-down locking mechanism shown in FIG. 2a, with the mechanism in its deployed configuration.

Looking first at FIGS. 2a and 2b, the invention is embodied in one form in a hold-down locking mechanism 20. This mechanism 20 includes a vane member 22 that is attached to the vehicle body 11 and a locking stop 24 that is attached to an arm 18 of the bail member 16 (see FIG. 1). The vane member 22 includes a vane 26 that is preferably in the form of a substantially rectangular plate. Of course, other configurations of the vane 26 are contemplated, the only requirement being that the vane have sufficient surface area to "catch" the wind W flowing along the side of the vehicle body 11.

Preferably the vane 26 has a number of stiffening ribs 27 defined along its width. The vane 26 is mounted to the vehicle body 11 by way of a hinge 28. As shown by comparing FIG. 2a with FIG. 2b, the hinge 28 allows the vane 26 to move from its neutral position (FIG. 2a) directly adjacent the vehicle body 11, to its deployed position (FIG. 2b) extending substantally perpendicularly from the container body.

In the preferred embodiment, the vane 26 defines a leading edge 30 that is angled outwardly away from a pressure face 32 (see FIG. 2b). The leading edge 30 allows the vane 26 to act in the nature of an airfoil and ensures that the air pressure generated by the wind W flowing along the side of the container body 11 does not to act to push the vane 26 toward the body, rather than away from the body to its deployed position shown in FIG. 2b. It can be appreciated that when subject to an adequate amount of air pressure, the vane gradually pivots along the hinge 28 away from the container body 11. As the apparent wind flow continues, the air pressure is exerted against the pressure face 32 to eventually push the vane 26 to the position shown in FIG. 2b.

The vane member 22 further includes a locking bar 34 that rotates with the vane 26. This locking bar 34 is configured to rest within the locking stop 24. In the preferred embodiment, the locking stop 24 is fixed to the arm 18 of the bail member 16. The locking stop 24 can include a back stop face 36 that restricts movement of the vane 26 back to its neutral position. In addition, the stop 24 preferably includes a ramp 37. As the air pressure generated by the wind W increases on the pressure face 32, the vane 26 pivots farther away from the container body 11. As the vane continues to pivot, the locking bar 34 attempts to travel up the ramp 37 of the locking stop 24. This additional travel increases the amount of downward force applied to the arm 18. This increased downward force can cause the bail member 16 to pivot about its pivot mount 17, which motion increases the amount of tension applied to the tarp 13.

In a most preferred embodiment, a return spring 38 can be disposed between the vane 26 and the container body 11. Most preferably, the return spring 38 is in the form of one or more torsion springs mounted along the hinge 28 and acting against the downwind face 33 of the vane 26. The return spring 38 normally operates to push the vane 26 back toward the container body 11, and away from the bail member arm 18. The strength of the spring can be calibrated to hold the vane 26 against the container body until a pre-determined air flow rate or pressure has been reached. This apparent wind or air flow rate can be achieved by the vehicle traveling at a particular speed. For example, the return spring 38 can be calibrated to hold the vane in the neutral position shown in FIG. 2a until the vehicle reaches the speed of 15 mph.

In the preferred embodiment illustrated in FIGS. 2a and 2b, the return spring 38 constitutes a torsion spring. Of course, other biasing devices can be utilized, including alternative types of springs. For example, a tension spring can be affixed between the leading edge of the vane member and the container body. In addition, the hinge 28 can be in the form of an elastic torsion bar that is supported at its ends on the container body and permitted to twist at its mid-point to which the vane is attached.

As further alternative of the preferred embodiment, the locking stop 24 can be integrated into the surface of the arm 18. In other words, the back stop and ramp feature can be formed directly into the arm itself. As a further alternative, the vane 26 can engage the locking stop, thereby eliminating the locking bar 34. In this instance the bottom edge of the vane may be at least slightly curved to facilitate its entrance in to and release from the locking stop 24.

Figure 3A:
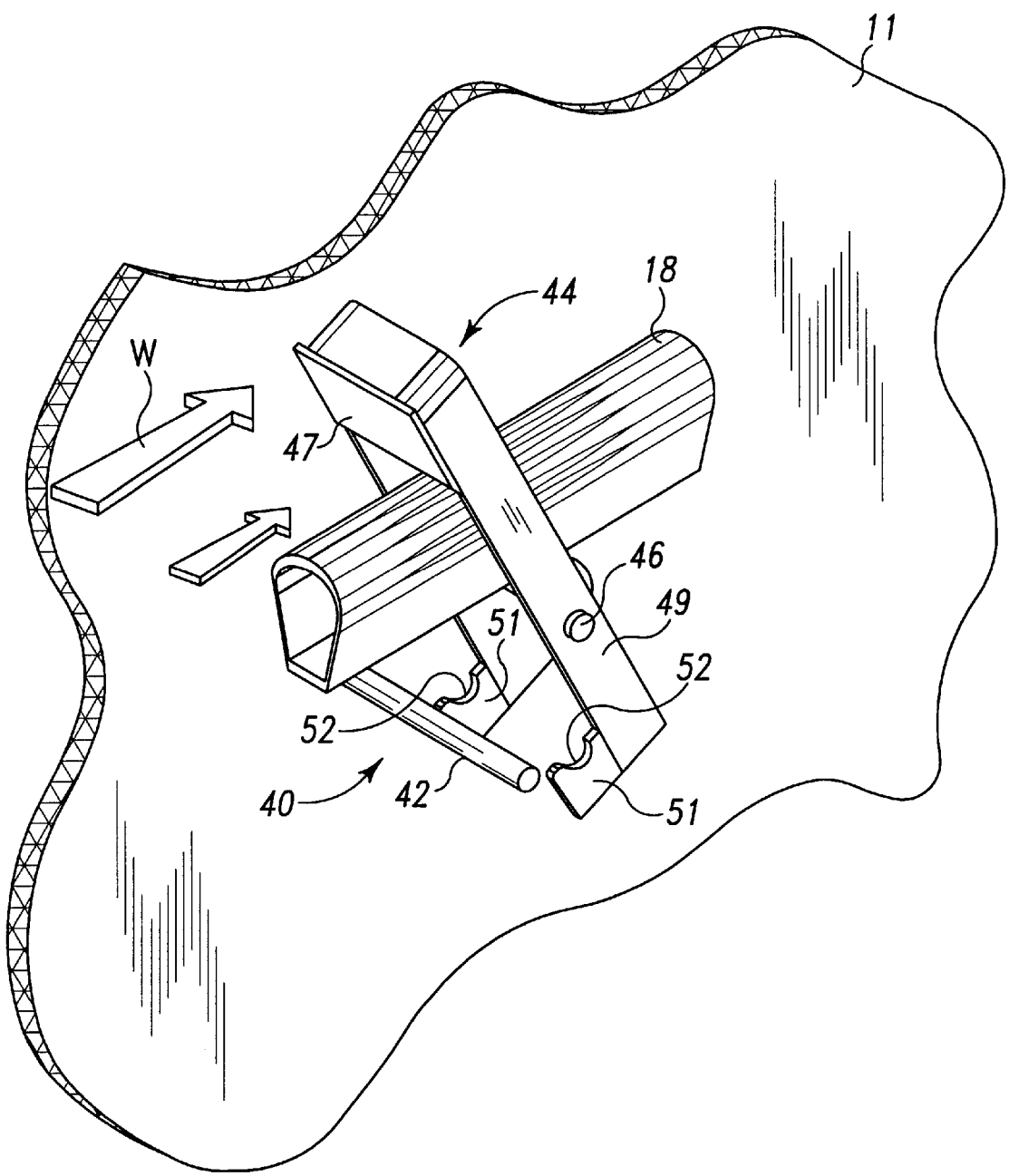
FIGS. 3a and 3b are side elevational views of a hold-down locking mechanism according to an alternative embodiment of the invention, shown in its neutral and deployed position.
Figure 3B:
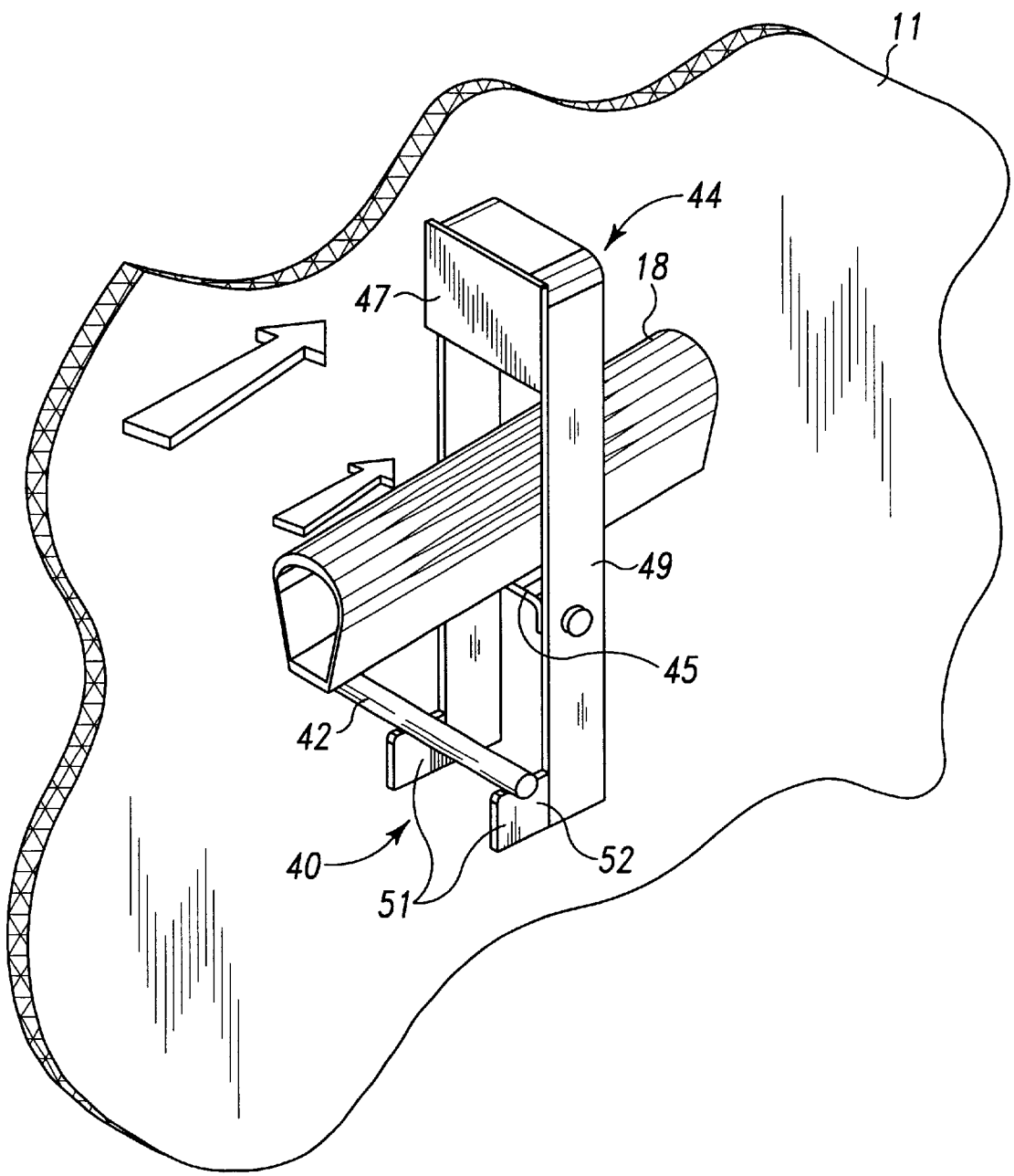
Figure 4:
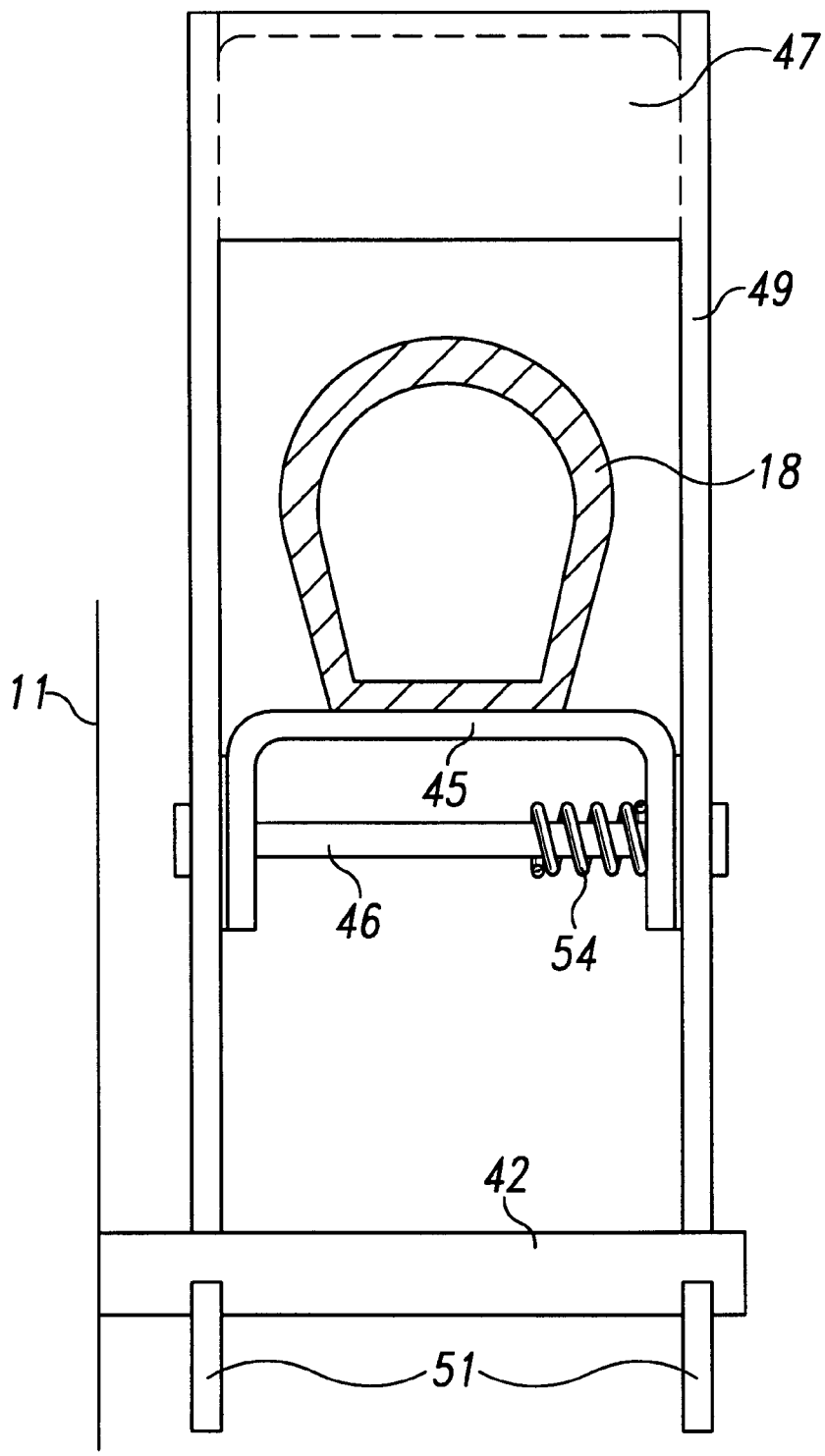
FIG. 4 is an end view of the mechanism shown in FIG. 3b.

An alternative embodiment of the present invention is depicted in FIGS. 3a, 3b and 4. In these figures, a hold-down locking mechanism 40 is illustrated that includes a vane member 44 mounted to the arm 18 of the bail member 16. In this embodiment the locking mechanism 40 includes a locking bar 42 that is attached to and projects substantially perpendicularly from the container body 11. The vane member 44 is preferably attached to the arm 18 by way of a mounting bracket 45. The mounting bracket 45 supports an axle 46 that engages a pivot element 49 of the vane member 44. Preferably the pivot element 49 is a substantially U-shaped bracket. A vane 47 is preferably affixed to the top of the U-shaped portion of the pivot element 49.

The pivot element 49 further includes a pair of locking legs 51 projecting outward from the lower end of the U-shaped bracket. Each locking leg 51 can define a locking notch 52 that has a shaped substantially conforming to the outer surface of the locking bar 42.

In its neutral position, as depicted in FIG. 3a, the vane member 44 is pivoted slightly forward so that the locking legs 51 are clear of the locking bar 42. As the air pressure due to the wind W increases, the pivot element 49 rotates to its actuated position shown in FIG. 3b. In this position, the locking legs 51 are directly beneath the locking bar 42, most preferably with the bar snugly disposed within the locking notch 52. Further wind pressure applied against the vane 47 simply enhances the fixation of the locking bar 42 to each of the locking legs 51 of the pivot element 49.

As with the previous embodiment, some form of biasing means can be provided to bias the vane member 44 to its neutral position shown in FIG. 3a. In one specific embodiment, the mechanism 40 can include a return spring 52, which in the illustrated embodiment is in the form of a torsion spring mounted between the mounting bracket 45 and the axle 46. Of course, other biasing mechanisms, including springs, are contemplated, as suggested previously.

Figure 5A:
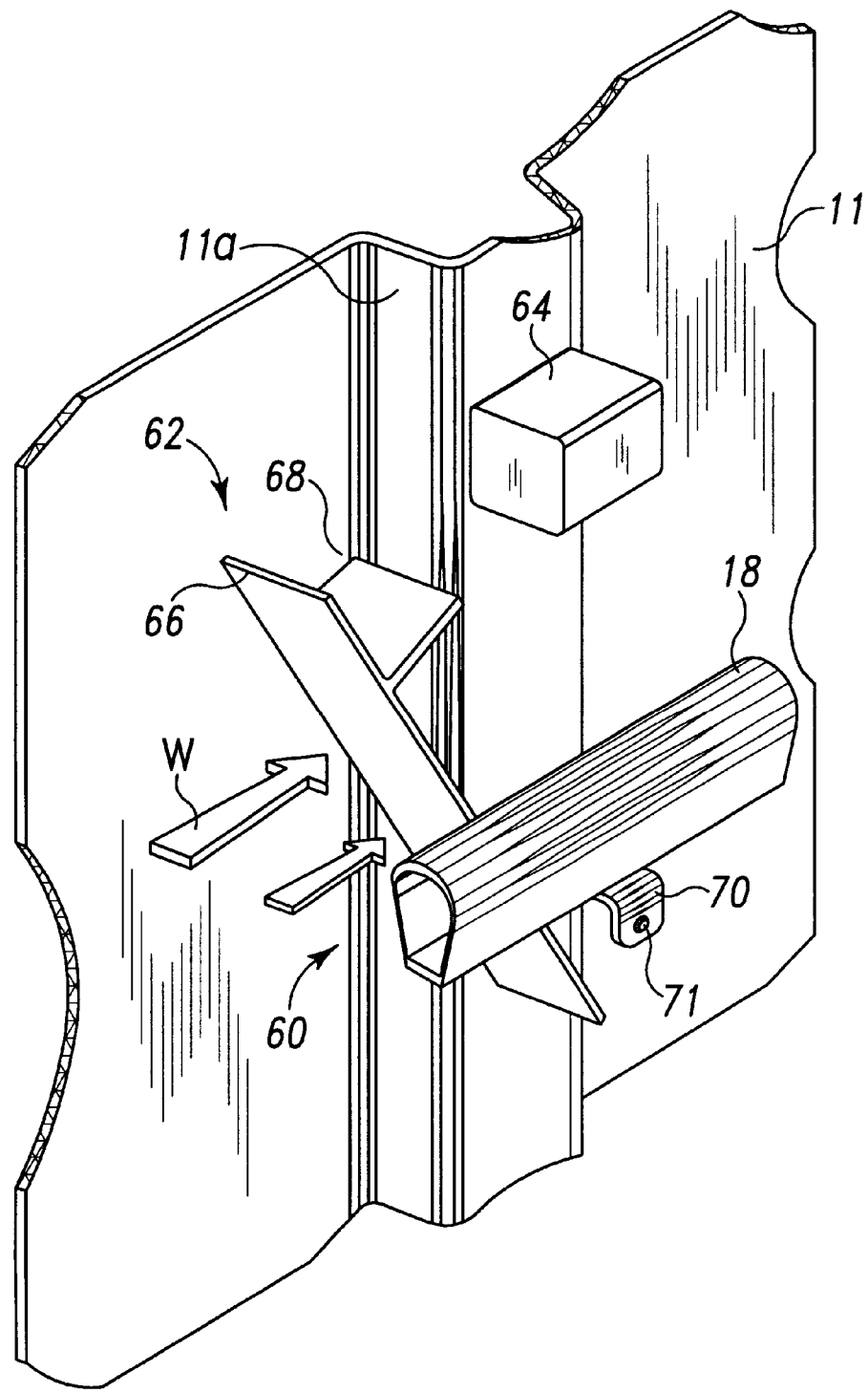
FIGS. 5a and 5b are side elevational views of still another embodiment of a hold-down locking mechanism according to the present invention, depicted in its neutral and deployed positions.
Figure 5B:
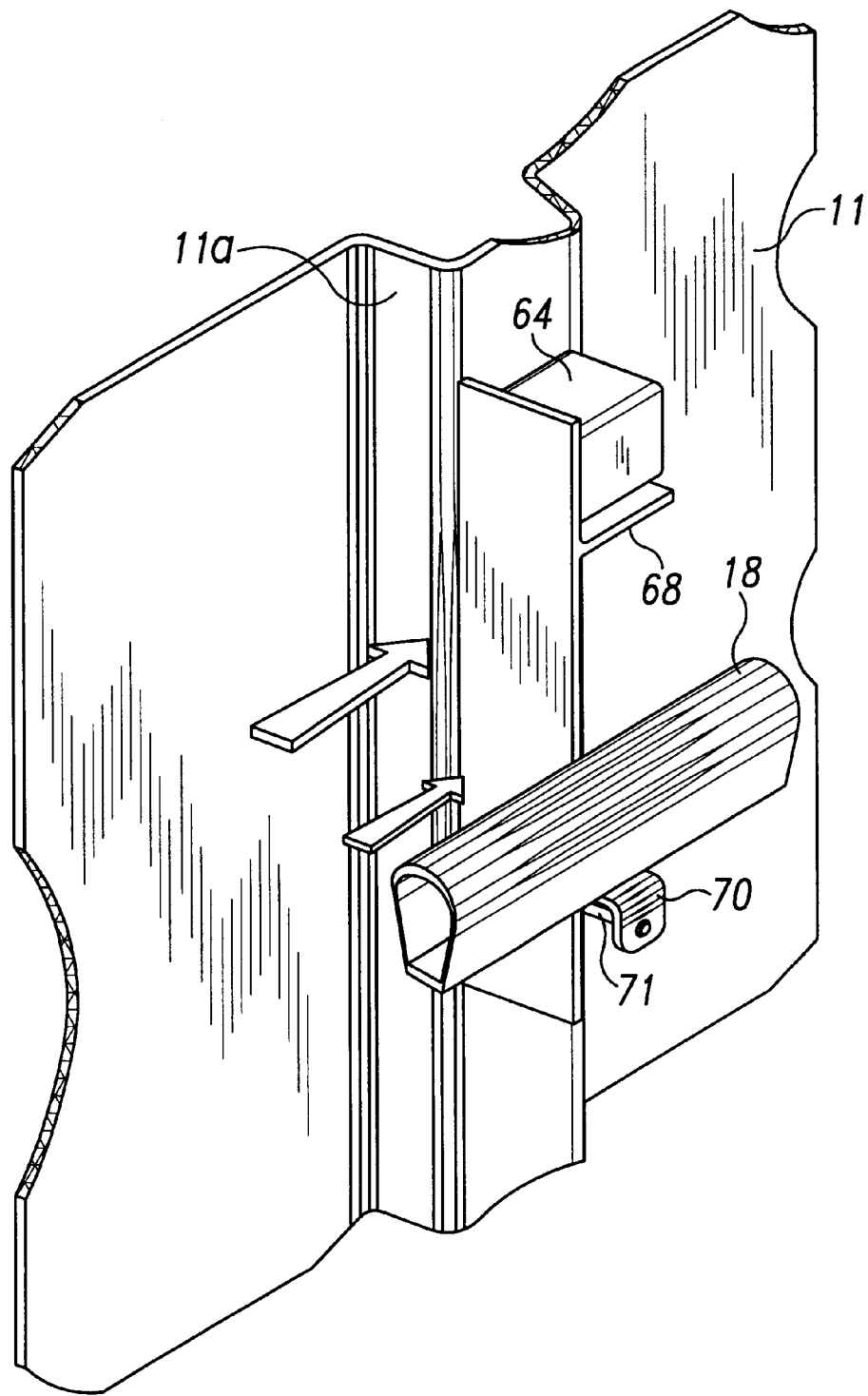
Figure 6:
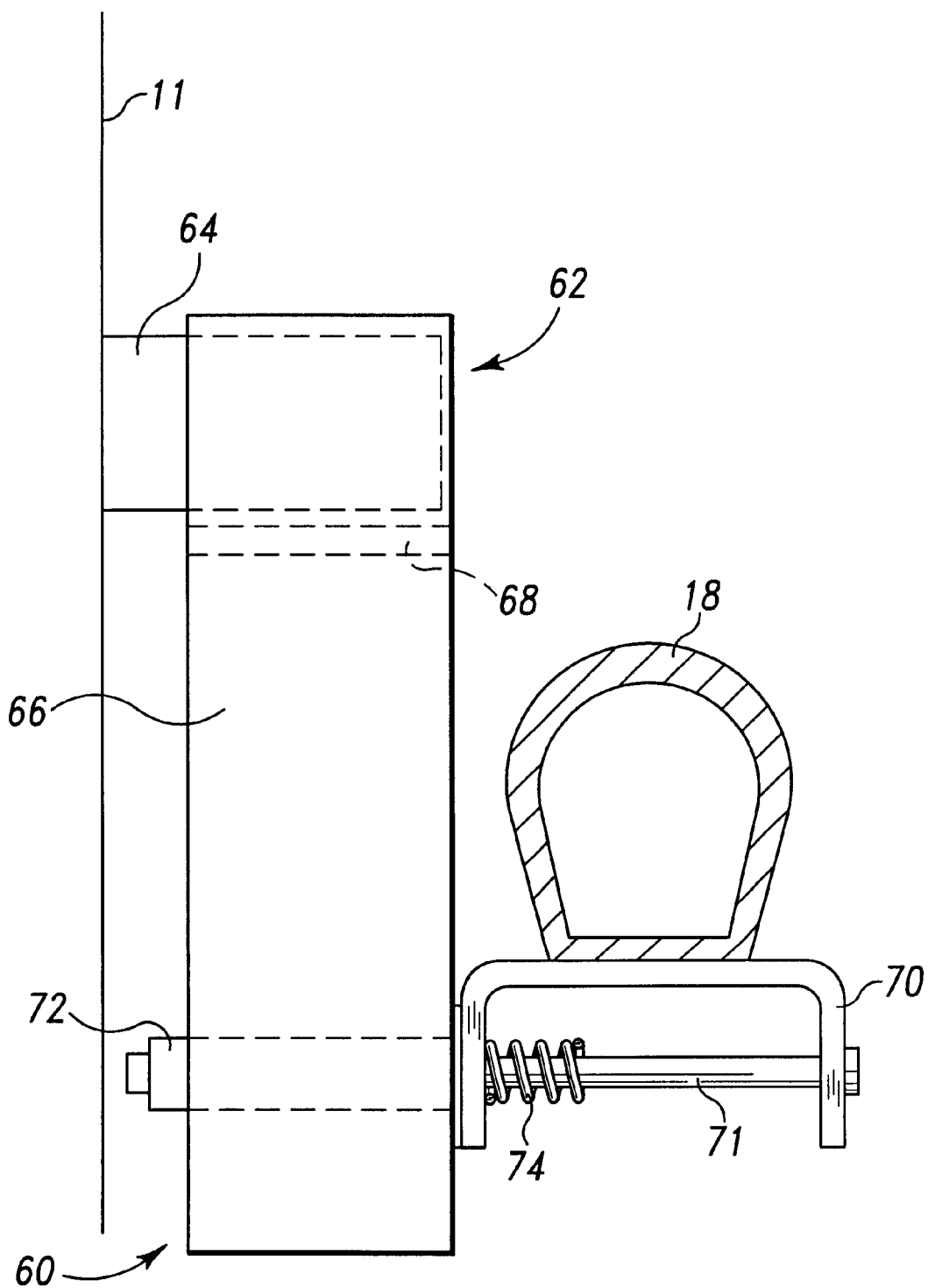
FIG. 6 is an end elevational view of the mechanism shown in FIG. 5b.

Referring to FIGS. 5a, 5b and 6, yet another embodiment of the invention is illustrated. In these figures, a hold-down locking mechanism 60 is also attached to the arm 18 of the bail member 16. In this embodiment, the mechanism includes a vane member 62 and a locking stop 64 that is mounted to the container body 11. The vane member 62 includes a vane 66 that faces the air flow passing along the side of the container body 11. A locking tab 68 projects from the opposite surface of the vane, facing the locking stops 64. Preferably, the locking tab 68 and vane 66 are shaped to generally conform to the forward surface shape of the locking stop 64. As shown in FIG. 5b, under action of the wind air flow, the vane member 62 pivots rearwardly until the locking tab 68 is disposed directly beneath the locking stop 64. The continued air pressure holds the vane, and most particularly the locking tab 68, in this deployed position. When the locking mechanism 60 is actuated, any vertical movement of the arm 18 is prevented as the locking tab 68 contacts the locking stop 64.

Preferably the vane member 62 is pivotally mounted directly to the arm 18, as shown in best in FIG. 6. In one preferred embodiment, a pivot mount 70 is engaged to the under side of the arm 18. An axle 71 projects outward form the pivot mount 70 and through a pivot sleeve 72 The pivot sleeve 72 is attached to the vane member 62. As with the previous embodiments, a biasing means 74 can be provided, which is preferably a torsional return spring mounted between the pivot mount 70 and the axle 71.

The hold-down locking mechanisms 20, 40 and 60 of the previous embodiments are most particularly suited for tarping systems in which the tarp 13 is extended essentially flat across the top of the container body. However, in some cases the tarping system includes an array of transverse bows spanning the width of the body to add some contour and height to the flexible tarp. While similar hold-down locking mechanisms can be implemented for a bow-type system, the present invention contemplates additional embodiments specifically configured for this type of tarping arrangement.

Figure 7:
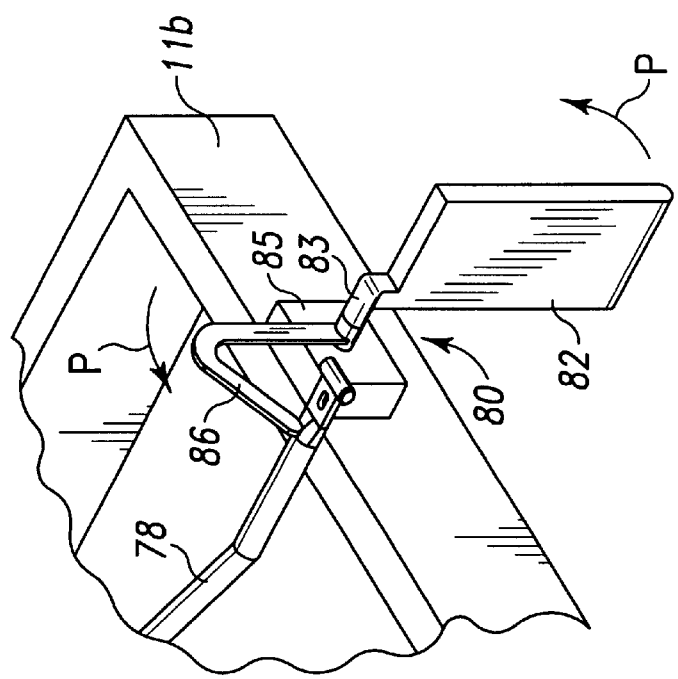
FIG. 7 is a side elevational view of a hold-down locking mechanism particularly suited for use with a bow-type tarping system.
Figure 2A:
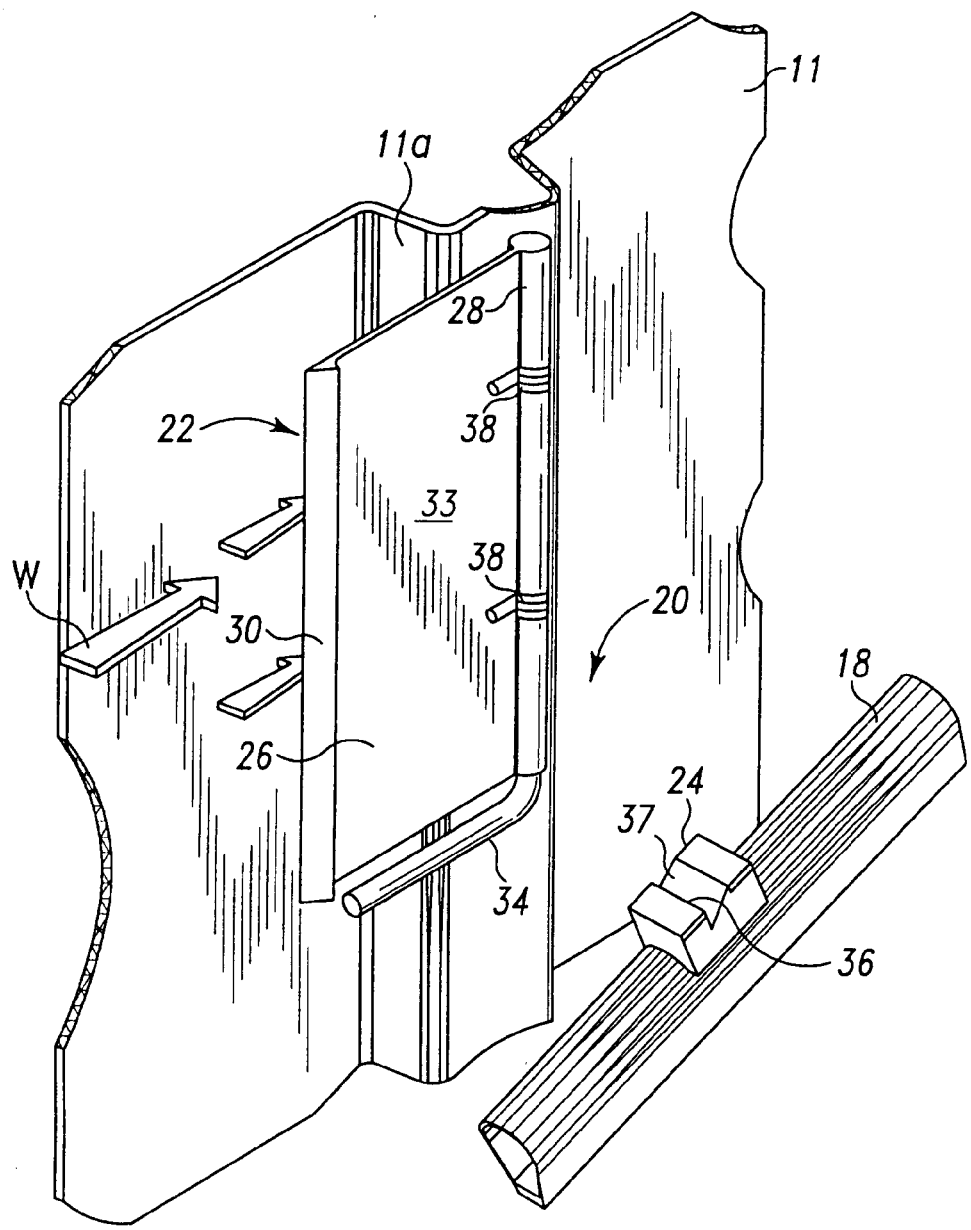

Most particularly a locking mechanism 80 as depicted in FIG. 7 is arranged to lock the tarp bow 78 to the top rail 11b of the vehicle container body. In this embodiment the mechanism includes a vane 82 that is pivotally mounted to the top rail 11b by way of a pivot bar 83. The pivot bar can be affixed to a mounting bracket 85 to permit pivoting movements of the vane in the direction of the arrow P. The locking mechanism 80 further includes a hook 86 that is attached to and rotates with the vane 82. As can be seen in FIG. 7, the hook 86 is configured to engage one end of the tarp bow 78 as the hook pivots in the direction of the arrow P. The shape and arrangement of the hook 86 can be adapted according to the structure of the end of the tarp bow 78.

As with the prior embodiments, the locking mechanism 80 of FIG. 7 can include a mechanical biasing means such as a spring. However, in the most preferred embodiment, the vane 82 is biased to its neutral position shown in this figure by the weight of the vane. As the vane 82 pivots in the direction of the arrow P away from the depicted vertical position, gravity generates a restoring force at the moving center of gravity of the vane. As long as the air pressure generated by the wind flow exceeds this downward force, the vane 82 will continue to pivot. However, once that air flow falls below a certain threshold, gravity will again restore the vane 82 to its vertical orientation. It is of course understood that the weight of the vane and hook 86 can be calibrated so that the vane only pivots to its locking position at a particular air flow velocity, corresponding to a particular vehicle speed.

This same gravity feature can be implemented to provide a restoring force to the vertically pivoting locking mechanisms 40 and 60 of FIGS. 3a–3b and 5a–5b, respectively. In both cases, the vane members 44 can be flipped upside down from the orientation shown in the figures, together with commensurate reorientation of the corresponding locking bar 34 or locking stop 64.

Figure 8:
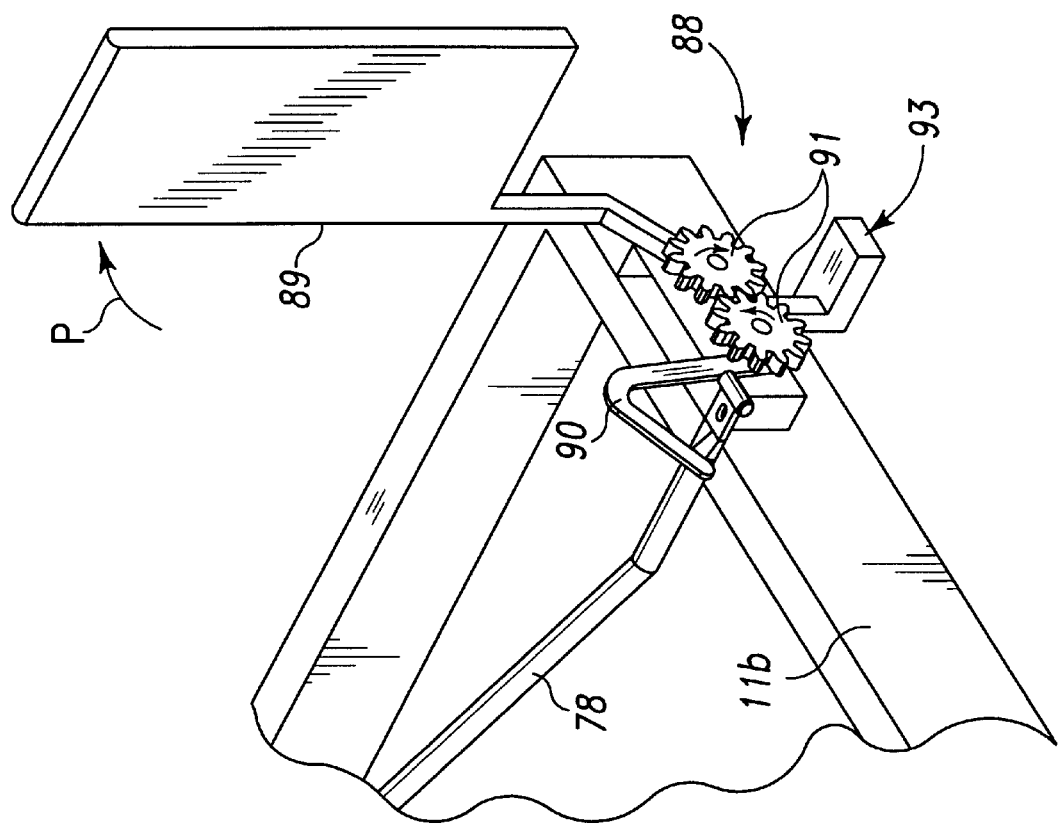
FIG. 8 is an alternative embodiment of a hold-down locking mechanism for use with a bow-type tarping system.

A locking mechanism 88 is illustrated in FIG. 8 that can be used to engage and lock the end of a tarp bow 78. In this mechanism a vane member 89 is independent of the locking member 90. The locking member 90 can have the same hook configuration as the hook 86 in the embodiment of FIG. 7.

In this embodiment, movement of the vane member 89 is transmitted to the locking member 90 through a gear train 91. In the illustrated embodiment, two spur-type gears are pivotally mounted to the container body pivoting the vane member 89 in the direction of the arrow P, causes the right (driving) gear of the gear train 91 to rotate in the direction R. This rotation causes a commensurate rotation in the left (driven) gear of the gear train which produces a corresponding pivoting movement of the locking member 90 toward the tarp bow 78.

The gear ratio of gear train 91 can be adjusted to adjust the holding force generated by movement of the vane member

89. For instance, a larger driving gear can be attached to the vane member 89 so that a small incremental pivoting of the vane member can yield a greater degree of pivoting of the locking member 90. When the locking member is engaged to the tarp bow 78, this gear ratio translates to the application of greater hold-down force applied to the bow.

As with the prior embodiments, a mechanical or spring-type biasing mechanism can be utilized to bias the vane member 89 and/or locking member 90 to the neutral position shown in FIG. 8. However, in the most preferred embodiment, a counter weight 93 is integrated into either the vane member 89 or the locking member 90. As with the embodiment of FIG. 7 the counter weight 93 reacts to the force of gravity to provide a restoring force contrary to the direction of rotation R of the gear train 91 or the direction of pivoting P of the vane member 89. Again, the mass of this counter weight 93 can be adjusted to control the force required to activate the locking mechanism 88.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For example, in all of the illustrated embodiments, the hold-down locking mechanisms are wind or air pressure activated. In an alternative approach, the vanes can be activated by human intervention. With this approach, the vehicle operator, for instance, can determine whether wind and traveling conditions are causing a problem with the container cover system.

In one embodiment of this human intervention approach, the locking elements can be deployed by activating a mechanical linkage or cable system. For instance, a cable can be linked to the vane member 22 of the embodiment of FIGS. 3a, b. Pulling the cable can cause the vane member to pivot into its deployed position. A similar cable arrangement can be employed with the locking mechanisms 40, 60, 80, and 88.

As a further alternative, the vane members can be electrically or hydraulically actuated. For instance, a vane member cen be connected to a rotary solenoid or motor operable to rotate the locking mechanism into its deployed position.

What is claimed is:

1. A hold-down locking mechanism for a cover system for an open-topped container, the cover system including a flexible cover deployable over the container by a deployment system, the deployment system having a movable deployment component connected between the container and the flexible cover, said mechanism comprising:
   a stop member attachable to one of the container or the movable deployment component; and
   a locking member pivotably mountable on the other of the container or the movable deployment component, said locking member including a locking element configured to engage said stop member to restrict relative movement between said locking member and said stop member and thereby restrict relative movement between the deployment component and the container.

2. The mechanism of claim 1 wherein said locking element includes a locking bar pivotably connected to the container and said stop member includes a locking stop attached to the deployment component, said locking stop being configured to receive said locking bar.

3. The mechanism of claim 2 wherein said locking bar is pivotable between a neutral position adjacent the container and a deployed position in engagement with said locking stop and said locking stop includes a stop face configured to restrict the movement of said locking bar from said deployed position to said neutral position.

4. The mechanism of claim 2 wherein said locking stop includes a ramp portion in sliding engagement with said locking bar when said locking bar is in said deployed position, said ramp arranged to increase the force exerted on the deployment component by said locking bar as said locking bar moves along said ramp away from said stop face.

5. The mechanism of claim 1 wherein said locking member further includes means for biasing said locking member towards the container.

6. The mechanism of claim 5 wherein said biasing means includes a return spring disposed between said locking member and the container to bias said locking member towards the container.

7. The mechanism of claim 1 wherein said locking member further includes a vane member defining a pressure face sized so that said locking member pivots in response to air flow acting on said pressure face.

8. The mechanism of claim 7 wherein said vane member defines a leading edge in the shape of an airfoil so that said vane member moves to expose said pressure face to air flow in response to air flow over said leading edge.

9. The mechanism of claim 7 further including biasing means for biasing said locking member towards the container, said biasing means calibrated to exert a biasing force holding said locking member in said neutral position, said biasing force being overcome by wind pressure acting on said vane member at a predetermined vehicle speed.

10. The mechanism of claim 7 wherein said locking member further includes a locking bar attached to said vane member and said stop member includes a locking stop attached to the deployment component, said locking stop being configured to receive said locking bar.

11. The mechanism of claim 1 wherein said locking member includes a manually actuated cable operable to move said locking member into engagement with said stop member.

12. The mechanism of claim 1 wherein said locking member includes a manually actuated solenoid operable to move said locking member into engagement with said stop member.

13. The mechanism of claim 1 wherein said locking member includes a mounting bracket attachable to the deployment component, said bracket including an axle projecting through said bracket for pivotably mounting said locking member thereto.

14. The mechanism of claim 13 wherein said stop member includes a locking bar attachable to the container and said locking member further includes a vane member pivotably mounted on said axle, said vane member defining a pressure face sized so that said locking member pivots in response to air flow acting on said pressure face, and said vane member including a pair of locking legs, each said locking leg defining a locking notch configured for engagement with said locking bar.

15. The mechanism of claim 14 wherein said locking member is pivotable between a neutral position disengaged from said stop member and a deployed position in engagement with said stop member; and said vane member further includes biasing means to bias said vane member in a neutral position.

16. The mechanism of claim 15 wherein said biasing means is calibrated to exert a biasing force holding said locking member in said neutral position, said biasing force being overcome by wind pressure acting on said vane member at a predetermined vehicle speed.

17. The mechanism of claim 15 wherein said biasing means includes a torsion spring between said locking member and said axle.

18. The mechanism of claim 13 wherein said locking member further includes:
   a vane member, said vane member defining a pressure face and a downwind face, said pressure face sized so that said locking member pivots in response to air flow acting on said pressure face; and
   an elongated pivot sleeve attached to said vane member and configured to receive one end of said axle therethrough for pivotable attachment of said locking member to said bracket.

19. The mechanism of claim 18 wherein said stop member includes a locking stop attached to the container and said vane member includes a locking tab attached to said downwind face, said tab configured to engage said locking stop to prevent vertical movement of the deployment component when said vane member engages said locking stop.

20. The mechanism of claim 18 wherein said locking member is pivotable between a neutral position disengaged from said stop member and a deployed position in engagement with said stop member; and said vane member further includes biasing means to bias said vane member in said neutral position.

21. The mechanism of claim 20 wherein said biasing means is calibrated to exert a biasing force holding said locking member in said neutral position, said biasing force being overcome by wind pressure acting on said vane member at a predetermined vehicle speed.

22. The mechanism of claim 21 wherein said biasing means includes a torsion spring between said locking member and said axle.

23. A hold-down locking mechanism for a cover system for an open-topped container, the cover system including a flexible cover deployable over the container by a deployment system, the deployment system having a movable deployment component connected between the container and the flexible cover, said mechanism comprising a wind-actuated locking member disposed between the container and the movable deployment component, said locking member configured to restrict relative movement between the movable deployment component and the container when said locking member is moved from a neutral position to a deployed position in response to air pressure acting on said locking member.

24. The mechanism of claim 23 wherein said locking member includes a vane member defining a pressure face sized so that said locking member pivots in response to air flow acting on said pressure face.

25. The mechanism of claim 24 wherein said vane member defines a leading edge in the shape of an airfoil so that said vane member moves to expose said pressure face to air flow in response to air flow over said leading edge.

26. The mechanism of claim 24 wherein said locking member further includes a locking bar attached to said vane member and configured for engagement with a stop member attachable to the deployment component.

27. The mechanism of claim 2 wherein said locking member includes a mounting bracket attachable to the deployment component, said bracket including an axle projecting through said bracket for pivotably mounting said locking member thereto.

28. The mechanism of claim 27 wherein said locking member further includes a vane member pivotably mounted on said axle, said vane member defining a pressure face sized so that said locking member pivots in response to air flow acting on said pressure face, and said vane member including a pair of locking legs, each said locking leg defining a locking notch configured for engagement with a locking bar attachable to the container.

29. The mechanism of claim 27 wherein said locking member further includes:
   a vane member, said vane member defining a pressure face and a downwind face, said pressure face sized so that said locking member pivots in response to air flow acting on said pressure face; and
   an elongated pivot sleeve attached to said vane member and configured to receive one end of said axle therethrough for pivotable attachment of said locking member to said bracket.

30. The mechanism of claim 29 wherein said vane member includes a locking tab attached to said downwind face, said tab configured to engage a locking stop attachable to the container to prevent vertical movement of the deployment component when said vane member engages said locking stop.

31. The mechanism of claim 2 wherein said locking member includes:
   a vane member, said vane member defining a pressure face sized so that said locking member pivots in response to air flow acting on said pressure face, and said vane member including means for pivotable attachment of said vane member to the container; and
   a locking element configured to engage a tarp bow when said vane member is pivoted from a neutral position to an engaged position.

32. The mechanism of claim 31 wherein said attachment means includes:
   a mounting bracket attached to the container; and
   a pivot bar pivotally attached to said mounting bracket, said pivot bar interconnecting said locking element with said vane member so that said locking element rotates with said vane member.

33. The mechanism of claim 31 wherein said vane member extends substantially vertically downward relative to said mounting bracket in said neutral position.

34. The mechanism of claim 31 wherein said locking element defines a hook.

35. The mechanism of claim 2 wherein said locking member includes:
   a vane member pivotably attached to the container, said vane member defining a pressure face sized so that said locking member pivots in response to air flow acting on said pressure face;
   a locking element configured to engage a tarp bow when said vane member is pivoted from a neutral position to an engaged position; and
   a gear train interconnecting said locking element and said vane member whereby said locking element pivots in response to rotation of said vane member.

36. The mechanism of claim 35 wherein the holding force applied to the tarp bow by said locking element is proportional to the gear ratio of said gear train.

37. The mechanism of claim 35 wherein said locking element defines a hook.

* * * * *

UNITED STATES PATENT AND TRADEMARK OFFICE
CERTIFICATE OF CORRECTION

PATENT NO.     : 6,234,562 B1
DATED          : May 22, 2001
INVENTOR(S)    : Michael D. Beck It is certified that error appears in the above-identified patent and that said Letters Patent is hereby corrected as shown below:

<u>Drawings,</u>
Fig. 2A, please substitute in lieu thereof the corrected attached formal drawing of Fig. 2A.

Signed and Sealed this

Fourteenth Day of January, 2003

JAMES E. ROGAN
*Director of the United States Patent and Trademark Office*